United States Patent [19]

Inoue

[11] Patent Number: 4,484,052
[45] Date of Patent: Nov. 20, 1984

[54] CUTTING METHOD AND APPARATUS

[75] Inventor: Kiyoshi Inoue, Tokyo, Japan

[73] Assignee: Inoue-Japax Research Incorporated, Yokohama, Japan

[21] Appl. No.: 356,747

[22] Filed: Mar. 10, 1982

[30] Foreign Application Priority Data

Mar. 13, 1981 [JP] Japan ............................. 56-35191
Nov. 27, 1981 [JP] Japan ............................ 56-189081
Nov. 30, 1981 [JP] Japan ............................ 56-190662
Nov. 30, 1981 [JP] Japan ............................ 56-190664
Dec. 28, 1981 [JP] Japan ............................ 56-209795

[51] Int. Cl.$^3$ ............................................. B23P 1/08
[52] U.S. Cl. ........................... 219/69 M; 219/69 W; 219/158; 83/167; 83/385; 269/8; 269/9
[58] Field of Search .............. 219/69 W, 69 E, 69 R, 219/69 M, 68, 158, 160; 269/8, 49, 21, 9; 83/167, 375, 385

[56] References Cited

U.S. PATENT DOCUMENTS 3,827,682 8/1974 Foster, Sr. et al. .................. 269/8
4,076,228 2/1978 Sheldon ............................. 269/49
4,347,423 8/1982 Katsube et al. ................. 219/69 W

FOREIGN PATENT DOCUMENTS 1484728 9/1977 United Kingdom .

Primary Examiner—M. H. Paschall
Attorney, Agent, or Firm—Karl F. Ross; Herbert Dubno

[57] ABSTRACT

The disclosed method and apparatus are related to the machine for and process of cutting a desired contour in a workpiece with an axially traveling elongate tool by relatively displacing the workpiece and the elongate tool transversely to the traveling axis of the latter along a predetermined cutting path describing the contour whereby the workpiece is progressively divided, along the cutting path, into a first portion held secured with a work support and a second portion tending, by its own gravity, to fall off the first. The fall-off is prevented according to the invention with a plurality of attractable members, e.g. permanent magnets, which are spacedly juxtaposed with the workpiece and releasably retained with respective support holders on a support assembly. During the course of cutting of the contour in the workpiece, these members are successively released and propelled from the respective support holders to deposit sequentially at spaced-apart locations on the advancing cutting path so that each of the members firmly bridges the first and second portions across the cut groove.

51 Claims, 21 Drawing Figures

FIG.8A
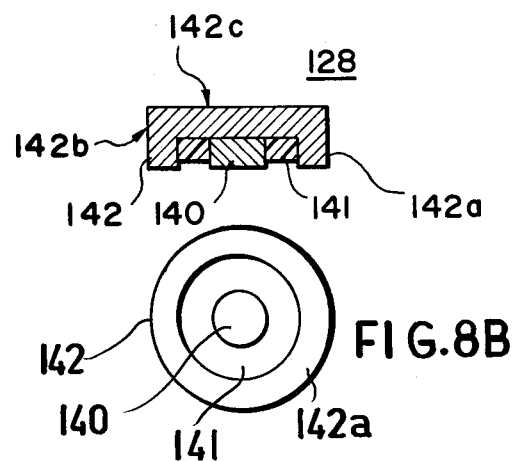
FIG.8B
FIG.13
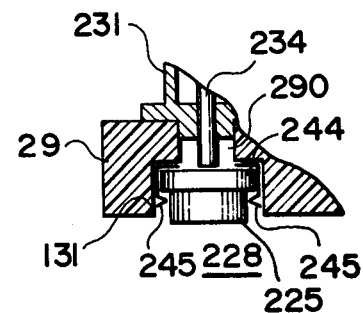
FIG.14
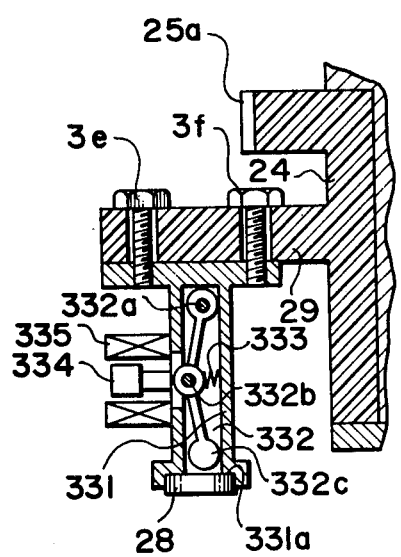
FIG.15
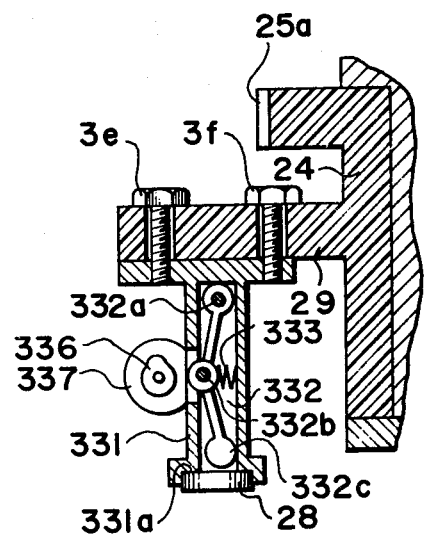

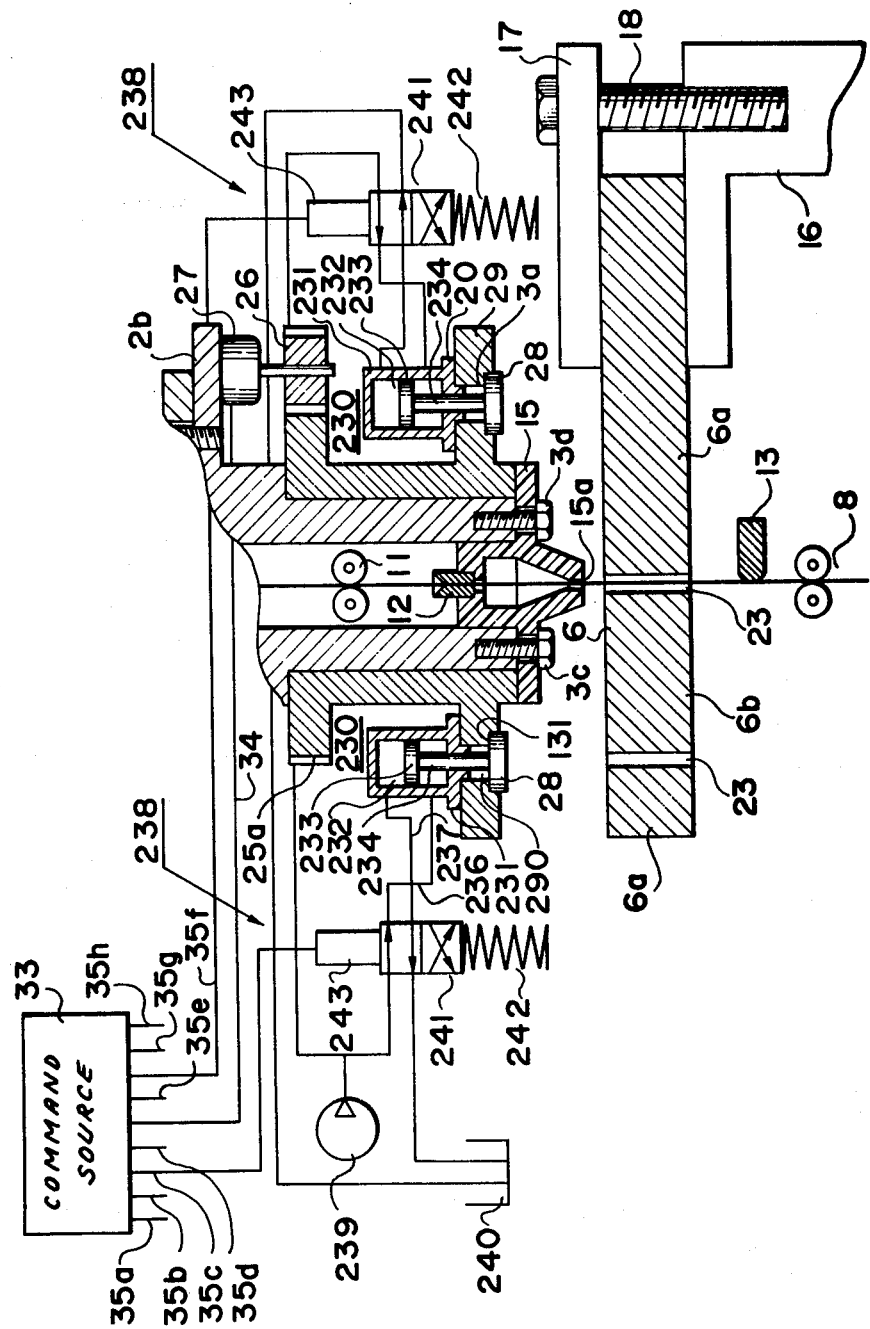

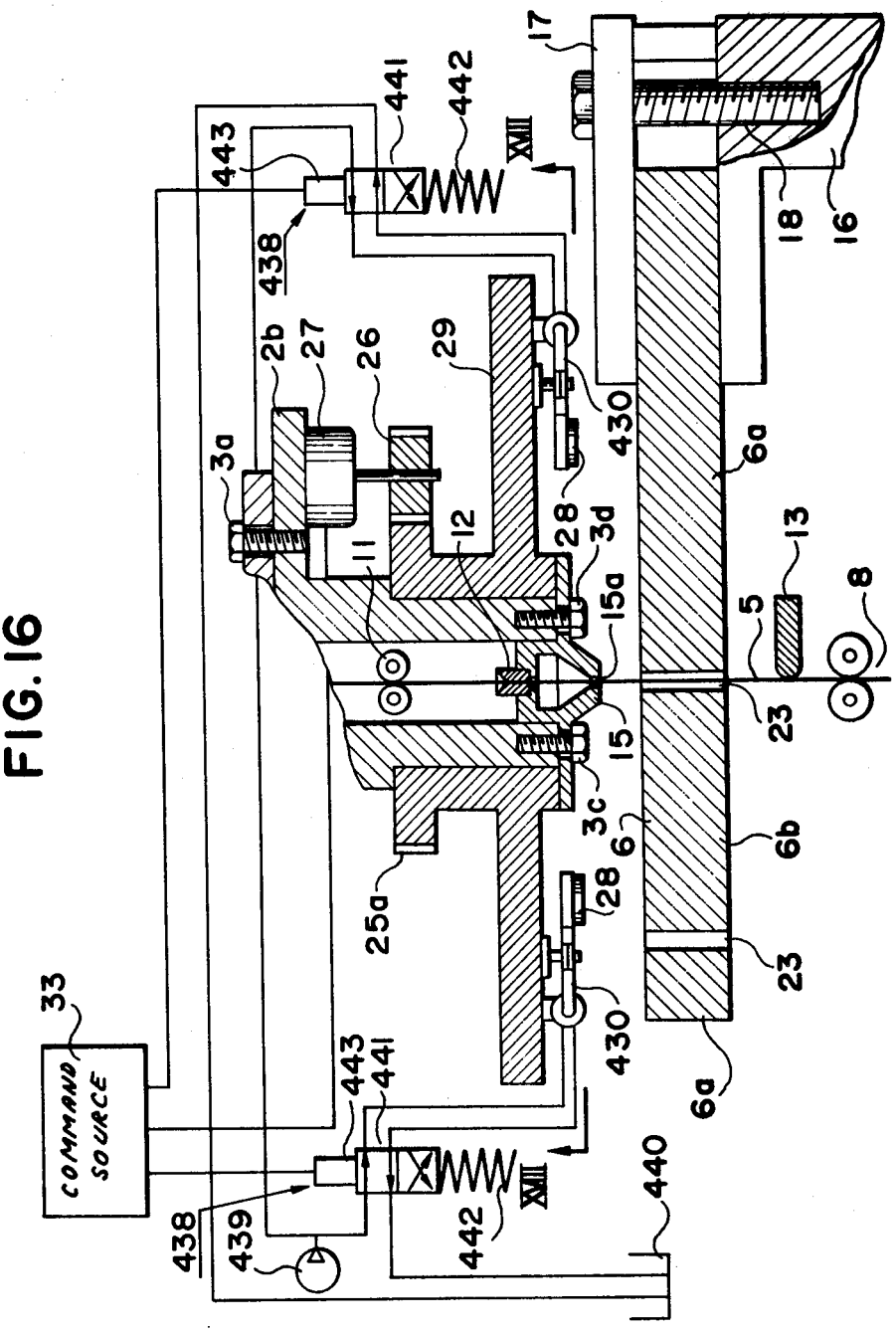

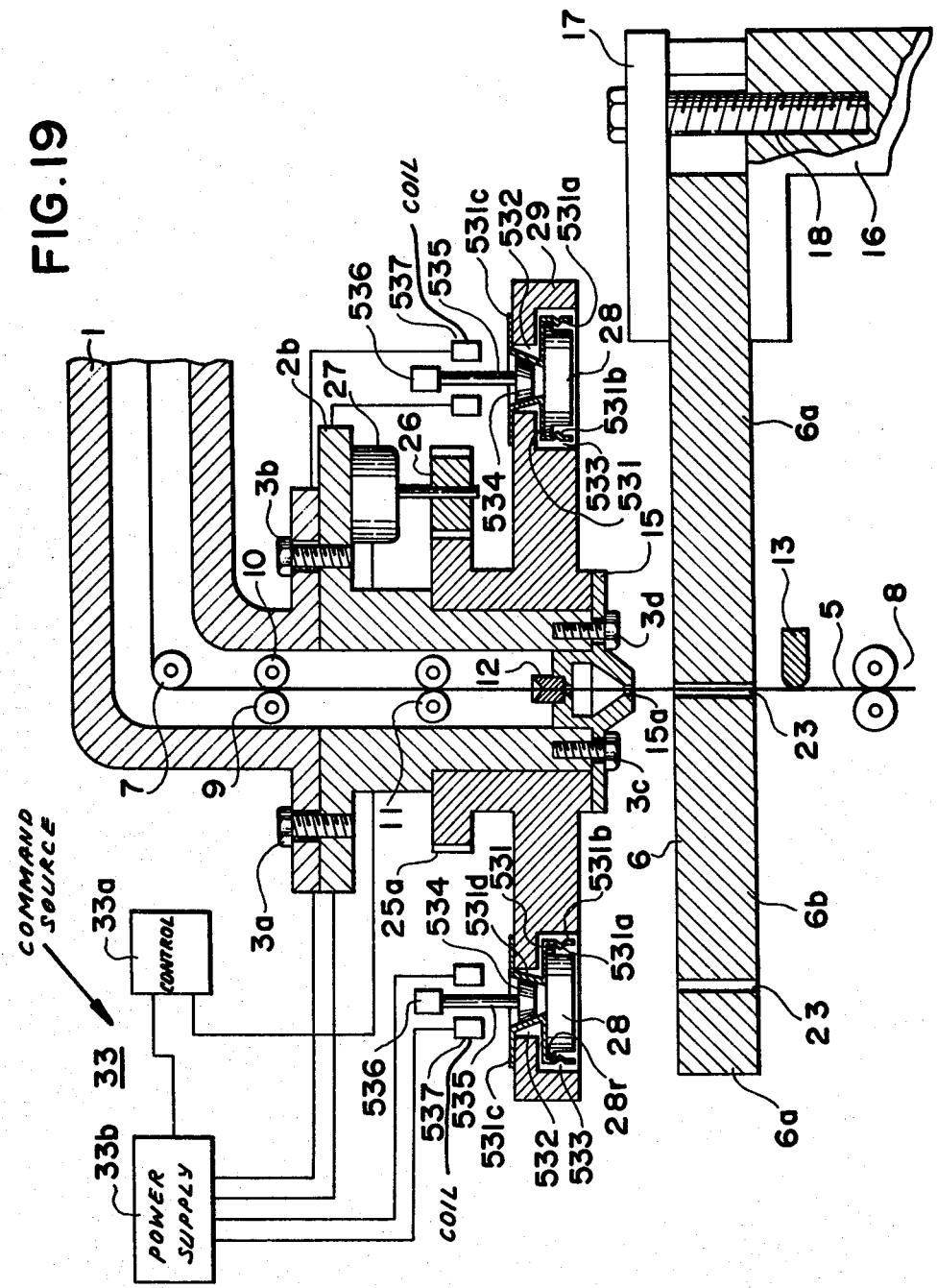

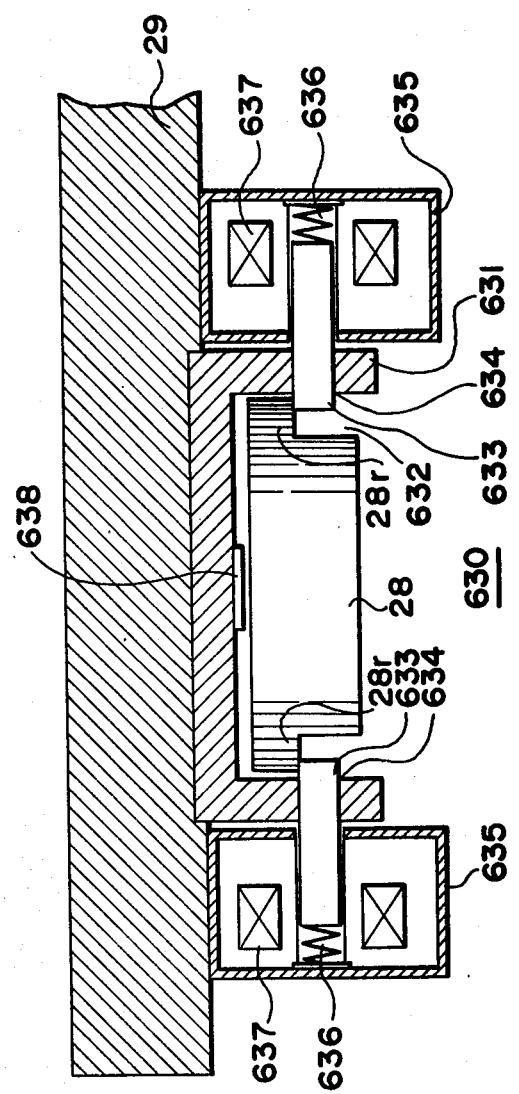

CUTTING METHOD AND APPARATUS

FIELD OF THE INVENTION

The present invention relates to machining processes and machines for cutting a desired contour in a workpiece with an axially traveling elongate tool by relatively displacing the workpiece and the elongate tool transversely to the traveling axis of the latter along a preprogrammed cutting path defining the contour whereby the workpiece is progressively divided, along the cutting path, into a first portion held secured with a workpiece support and a second portion tending, by its own gravity, to fall off the first member. The invention is particularly concerned with an automatic method of and apparatus for preventing the second portion as referred to from falling off the first portion while the cutting tool achieves the desired contour in the workpiece.

The term "cutting" is used herein to include both mechanical and electroerosive cutting. The term "elongate tool" is used herein to refer to an electroerosive or mechanical cutting tool in any form of a wire, ribbon and tape, all of which will simply be referred to as "wire" or "wire tool" hereinafter. The electroerosive elongate cutting tool may be an electrode wire composed, say, of copper or brass and having a thickness or diameter 0.1 and 2 mm. The mechanical cutting elongate tool may be a smooth or abrasive-bonded wire tool.

BACKGROUND OF THE INVENTION

The process of cutting straight, curved, intricate and/or closed-loop contours in workpieces is well known and has especially been used in the traveling-wire electroerosion machining art. In this process, a workpiece is commonly carried securely on a work support and a continuous electrode wire continuously dispensed from a supply spool is axially passed through the workpiece and continuously collected onto a takeup side. Since the electrode wire is caused to travel through the workpiece, the work support which has a supporting surface commonly extending horizontally cannot carry the entire lower area of the workpiece on this supporting surface. A machining region of the workpiece must be left unsupported by the supporting surface to allow a desired cut to be formed therein. The weight of this region of the workpiece and that of the remainder thereof may equally apply on the work support initially. As cutting advances, however, so that the workpiece is progressively divided into two portions with respect to the advancing cutting path, it will be apparent that while one portion is held supported by the work support, the other tends to fall off the one portion by its own weight due to gravity. It will be readily apparent that an actual drop-off of the unsupported portion takes place when the two portions are severed from one another and this may occur even before the preprogrammed cutting path is completely finished and that the drop-off may break the cutting electrode wire and may seriously damage the workpiece.

A measure commonly employed in the art heretofore to avoid this problem is that when machining approaches the end point of the cutting path, the operator interrupts the operation of the machine, places an additional work support in the form of a block of suitable height and width supporting workpiece against the gravity acting on the portion tending to fall off, and restarts the machine to allow the two portions to be severed by the continued wire-cutting operation. The gravity-resisting block as the additional work support may be replaced by a permanent magnet briged across the severed portions or an adhesive applied in the cut groove. Obviously, these conventional procedures are bothersome and inefficient as far as they entail the operator's attention and labor. It should also be noted that the actual drop-off is not the sole problem arising from the unsupported portion of the workpiece being divided. It has now been found that even before it reaches a severing point, the unsupported portion tending to fall off the other portion causes a deflection of the workpiece to the extent that the cutting zone is dislocated and hence the cutting accuracy is significantly affected.

OBJECTS OF THE INVENTION

It is, accordingly, an important object of the invention to provide a novel method for use in the process of cutting a workpiece whereby an unsupported portion of the progressively divided workpiece is effectively and efficiently prevented from falling off and even from tending to fall off the other portion of the workpiece.

Another object of the invention is to provide a novel apparatus for use with a workpiece cutting machine, which is relatively simple and yet operates automatically not only to completely eliminate the possibility of one severed portion of the workpiece to drop off the other during the course of cutting operation but to maintain the cutting accuracy achieved by the machine against the tendency of the one severed portion to fall off the other through the cutting operation.

SUMMARY OF THE INVENTION

According to the present invention there is provided, in a first aspect thereof, a new and improved method for practice in the process of cutting a contour in a workpiece securely carried partially on a work support by axially transporting an elongate tool through the workpiece while relatively displacing the work support and the traveling elongate tool to advance the workpiece transversely to the traveling axis of the elongate tool whereby the workpiece is progressively divided, along the advancing cutting path, into a first portion held secured with the support member and a second portion tending, due to gravity, to fall off the first portion, the method effectively preventing the second portion from falling off and tending to falling off. The method according to the invention comprises: (a) spacedly juxtaposing with the workpiece, a plurality of attractable members releasably retained with respective support holders on a support assembly, each of the members when brought proximate to the workpiece being capable of being attracted thereto by permanent magnetism; (b) initiating the cutting of the workpiece while holding the attractable members respectively to be retained with the support holders; and (c) during the course of cutting the contour in the workpiece, successively releasing the attractable members and propelling them from the respective support holders to deposit the attractable members successively at mutually spaced-apart locations on the advancing cutting path so that each of the members bridges across the first and second portions.

The invention is, advantageously, employed in the process of the traveling-wire electroerosion machining of the workpiece with the elongate cutting tool being an electrically conductive wire, ribbon, band or tape, although the invention may also be practiced in mechanical or abrasive cutting. In the latter process, the cutting tool may be an abrasive-bonded wire, ribbon, band or tape, i.e. an elongated element coated with abrasive particles or having such particles bonded on the periphery thereof. The cutting tool may also be an elongated element having edges formed thereon and may further be a relatively smooth wire or the like. Abrasive cutting with a traveling smooth elongate element may be practiced by supplying a liquid suspension of abrasive particles into the cutting region between the element and the workpiece.

Conveniently, each of the attractable members in the method of the invention is constituted by a permanent magnet and may be a mass of adhesive. It is essential that the member when brought in contact with a region of the first and second portions, either outside or inside the cut groove, be capable of being permanently attracted and hence attached thereto bridging the first and second portions. In steps (a) and (b), each of the members may be retained and held to be retained, for example, by a magnetic attraction, a fluid pressure (e.g. a vacuum pressure) and/or a mechanical support (e.g. lever, gear or toggle). In step (c), each of the members may be released by releasing such a retension force or action and may be propelled by gravity, a fluid pressure (e.g. an air pressure) and/or a mechanical thrust (e.g. by lever, gear, toggle or piston). A supplemental releasing force or action such as a magnetic repulsion, fluid pressure and/or mechanical thrust may be added to release each of the members from the support holder therefor.

The invention also provides, in a second aspect thereof, an apparatus for use with a machine for cutting a contour in a workpiece, having a work support for securely carrying the workpiece partially on its support surface, an elongate cutting tool, means for axially transporting the elongate cutting tool through the workpiece and machining feed means for relatively displacing the work support and the traveling elongate cutting tool to advance the workpiece transversely to the traveling axis of the elongate tool along a programmed cutting path defining the contour whereby the workpiece is progressively divided, along the advancing cutting path, into a first portion held secured with the work support and a second portion tending, by its own gravity, to fall off the first portion, the apparatus being designed for effectively preventing the second portion from falling off and tending to fall off the first member. The apparatus according to the invention comprises: a plurality of support holders carried on a support assembly for releasably retaining a plurality of attractable members, respectively, each of the members when brought proximate to the workpiece being capable of being permanently attracted thereto; retention means associated with the support holders for holding the respective attractable members to be retained therewith and spacedly juxtaposed with the workpiece; and drive means associated with the retention means and adapted to release the holding actions of the attractable members by the respective support holders and, while the machine is in operation or loaded with the workpiece for cutting the contour therein, operable automatically in response to successive time-spaced timing signals for successively propelling the respective attractable members from the individual holders to deposit the attractable members successively at mutually spaced-apart locations on the advancing cutting path so that each of the members bridges across the first and second portions.

The machine customarily includes a machine head with tool support means for supporting the elongate cutting tool across the workpiece. The support assembly may be carried on the machine head to locate the support holders so that the attractable members may be positioned above or below the workpiece and spacedly juxtaposed with the upper or lower surface thereof. The support assembly may include a base carried on the machine head and a plurality of arms extending from the base and carrying the support holders, respectively, with which the respective attractable members are releasably retained and juxtaposed with the workpiece. It will be apparent that the base may be of any form. Thus, the base may include or may be in the form of a disk or plate on which the support holders respectively retaining the attractable members are carried in a predetermined pattern of arrangement, e.g. a circle or a plurality of rows of circles.

The base may be carried on the machine head rotatably about an axis thereof or the traveling axis of the elongate tool and may then be rotated by motor means in response to a rotary positioning signal furnished from a command source to bring each of the attractable members immediately above or below each location on the cutting path behind the cutting zone or the axis of the elongate cutting element advancing in the workpiece.

The machine customarily includes, as part of the aforementioned machining feed means, a control unit, e.g. a numerical controller, which has the cutting path preprogrammed therein and, based thereon, furnishes machining feed signals for relatively displacing the work support and the traveling axis of the elongate cutting tool. This allows cutting precisely to proceed along the programmed path to form the desired contour in the workpiece and thus precisely indicates the position of a desired point spaced by a given distance from the instantaneous cutting zone along the programmed cutting path. The command source may accordingly be connected to the control unit to sequentially furnish the timing signals to provide the drive signals sequentially to release the attractable members and/or to provide the positioning signals for the support assembly to locate the attractable members successively immediately above or below the respective desired locations on the cutting path behind the cutting zone.

BRIEF DESCRIPTION OF THE DRAWING

These and other objects and features of the present invention as well as advantages will become more readily apparent from the following description of certain preferred embodiments thereof, which are given by way of example only, made with reference to the accompanying diagrammatic drawings in which:

FIGS. 8(A) and 8(B) are side and plan views diagrammatirally illustrating a permanent magnet assembly according to the invention;

FIG. 12 is a diagrammatic side elevational view of an essential portion of the machine with a modification of the embodiment of FIG. 10;

FIG. 13 is a side view diagrammatically illustrating a further embodiment of the permanent magnet assembly according to the invention;

FIG. 14 is a side view diagrammatically illustrating a further support holder unit using a toggle switch system;

FIG. 15 is a diagrammatic side view of a modification of the embodiment of FIG. 14;

FIG. 16 is a side view diagrammatically illustrating an essential portion of the machine with a further embodiment of the invention in which a plurality of scissors-type support holders are used to releasably retain the respective permanent magnets;

FIG. 19 is a diagrammatic side-elevational view of the machine with a further embodiment of the invention using a plurality of spring-metal support holder for releasably retaining the respective magnets; and FIG. 20 is a side view diagrammatically illustrating a further support holder of the invention.

SPECIFIC DESCRIPTION

In the description which follows, several embodiments thereof will be described with reference to a typical electroerosion or abrasive cutting machine using as the elongate cutting element a wire electrode or a wire tool, referred to simply as a wire.

Figure 1:
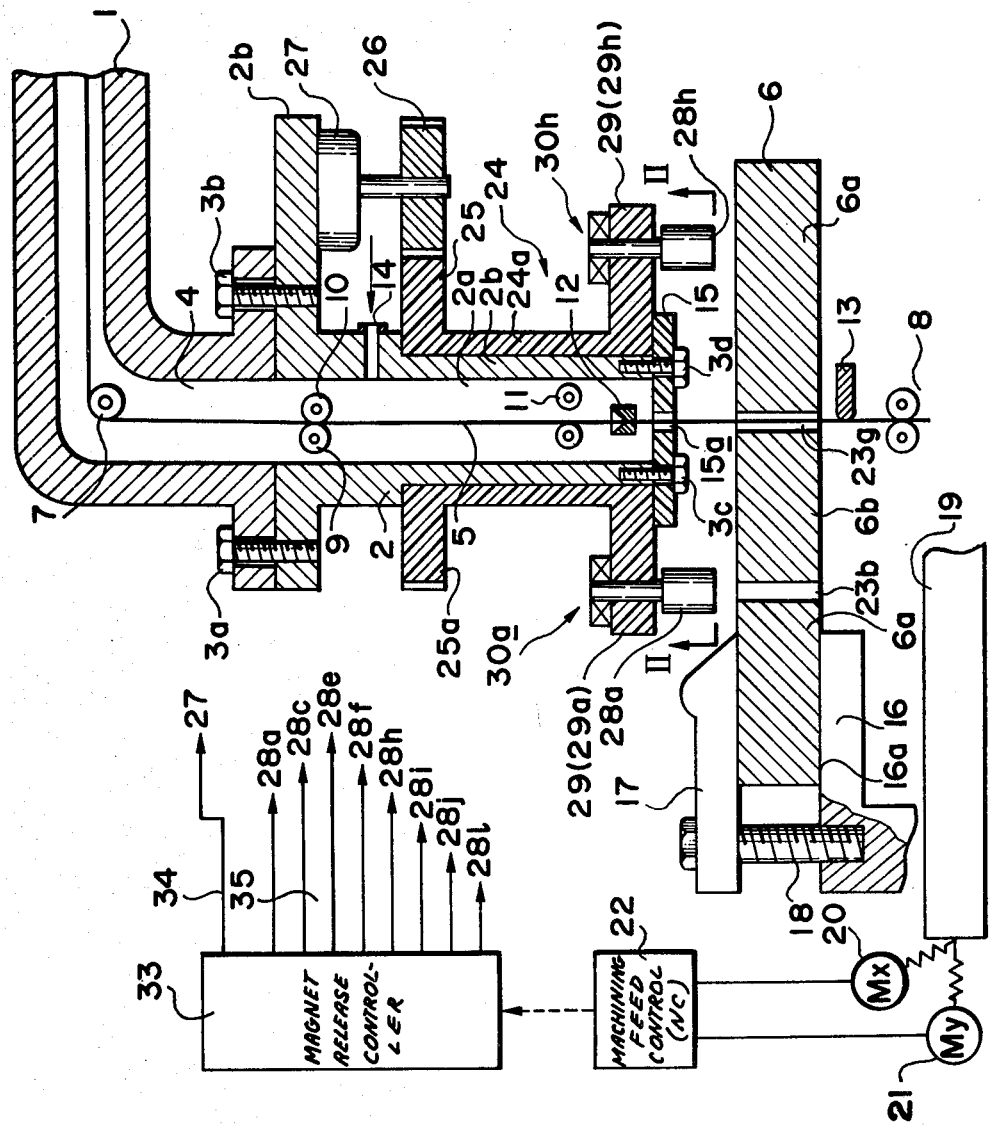
FIG. 1 is a side-elevational view diagrammatically illustrating an essential portion of a wire-cutting machine incorporating an embodiment of the invention in which a plurality of permanent magnets are releasably retained by respective support holders carried by a support assembly so as to surround the cutting wire tool immediately above the workpiece.

Referring first to FIG. 1, the machine includes an arm 1 shown in the form of a tubular housing, which horizontally extends from the machine column (not shown) extending vertically from the machine base (not shown) and defines a passage 4. The tubular arm 1 is curved downwards and carries at its lower end a machine head 2 which is secured thereto by means of bolts 3a and 3b. The head 2 is also shown to be tubular to define a passage 2a for a wire 5 which is fed from a supply (not shown) and transported axially to travel through a workpiece 6 in a cutting region. The wire 5 is shown to be deflected over a guide roller 7 from a horizontal to a vertical downward direction within the tubular arm 1 and is continuously pulled forwards by a wire drive unit 8 disposed downstream of the cutting region. Within the tubular machining head 2 the traveling wire 5 is guide between a pair of pinch rollers 9 and 10, one or both of which may also serve to conduct a machining current to the wire 5 in the electroerosion machining arrangement. A braking roller unit 11 is also provided to apply a backward traction to the wire 5 to maintain it sufficiently taut while traveling through the cutting region. A pair of machining wire support and guide members 12 and 13 is provided, the former within the passage 2a in the machining head 2 above the workpiece 6 and the latter below the workpiece 6. A machining liquid from a reservoir (not shown) may be introduced into the passage 2a through an inlet conduit 14 and passed into the cutting region through a central opening 15a in a plate 15 attached at the lower end of the cylinder 2b of the machining head 2 by bolts 3c and 3d.

The workpiece 6 is shown in the form of a plate extending horizontally or in an X-Y plane and is mounted on a workstand 16 and clamped thereto by a holding plate 17 and a bolt 18. The workstand 16 is securely carried on a worktable 19 which has a pair of motors 20 and 21 drivingly coupled therewith and is displaceable thereby horizontally. Since the traveling wire 5 is passed through the workpiece 6 and its axis is to move relative to and through the workpiece 6 by a given distance of cutting, the work support surface 16a of the stand 16 must be offset as shown and a substantial width of the lower surface of the workpiece 6 must be left unsupported by the support surface 16a.

The motors 20 and 21 are driven in response to drive signals furnished from a machining feed control unit 22, e.g. an NC (numerical control) unit, to displace the workpiece 6 in the X-Y plane transverse to the axis of travel of the cutting wire 5, thereby forming a cut in the workpiece 6. The control unit 22 has preprogrammed therein a predetermined path of cut, i.e. the trajectory of the workpiece moving relative to the axis of the wire 5, corresponding to a desired contour of cut to be formed in the workpiece 6. The preprogrammed data for the cutting path are transformed in the control unit 22 into drive signals for the motors 20 and 21. As the motors 20 and 21 are driven, the workpiece 6 is displaced along the programmed cutting path which may be one represented at 23 in FIG. 3. The cutting may commence at a position of the workpiece 6 shown at A and, after following the path 23 including positions B, C, D, E, F, G, H, I, J, K and L in turn, may return to the position A.

Referring back to FIG. 1, two intersections of the groove 23 cut through the workpiece 6 are shown at 23b and 23g and it is apparent that cutting is in progress at the region 23g. As cutting advances, the workpiece 6 is progressively divided, along the advancing cutting path 23, into a right-hand side portion 6a and a left-hand portion 6b as viewed in FIG. 1 with respect to the cut groove 23g. As viewed with respect to the cut groove 23b, the first and second portions 6a and 6b are located on the left-hand side and the right-hand side, respectively. While the first portion 6a extending across the two end sides of the workpieces 6 is firmly held by the work-support assembly 16-18, it is seen that the other portion 6b without a supporting surface tends, due to gravity, to fall off the first portion 6a. In accordance with the present invention, not only an actual fall-off of the second portion which may occur when the cutting path is just to finish the whole length and approaches the starting position or hole A but also its tendency of falling off the first portion midway along the path 23 can effectively be eliminated.

Figure 2:
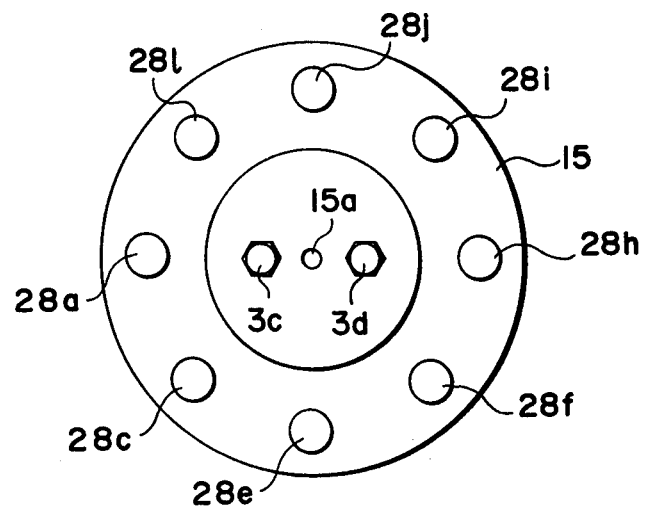
FIG. 2 is a plan view taken along the line II—II in FIG. 1.
Figure 4:
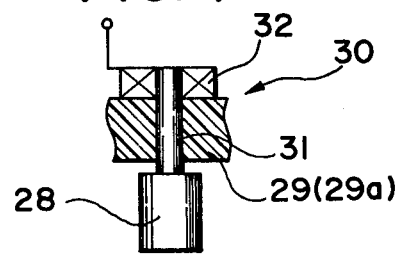
FIG. 4 is a general side-elevational view of a portion of the arrangement shown in FIG. 1.

The embodiment of the invention shown in FIG. 1 includes a rotary support assembly 24 which may be made of plastic and is carried on the machining head 2 rotatably about the axis of travel of the wire 5. The plate 15 secured to the machining head 2 serves to hold the support assembly 24 against sliding down. The assembly 24 shown as an upper annular flange 25 on the periphery of which is formed a gear 25a which is in mesh with a gear 26. A motor 27 drivingly coupled with the gear 26 is shown mounted to an upper flange 2b of the machining head 2. The assembly 24 is also shown having at its lower end a support disk 29 composed again of plastic which releasably carries a plurality of permanent magnets 28a, 28c, 28e, 28f, 28h, 28i, 28j and 28l, of which only 28a and 28h are seen in FIG. 1 and the others are included in FIG. 2. The disk 29 as shown in FIG. 1 may also be considered as a plurality of arms extending from the cylindrical tubular base member 24a, it being noted that the arms can be designated by 29a, 29c, 29e, 29f, 29h, 29i, 29j and 29l. On the disk 29 the permanent magnets 28a–28l are releasably retained by respective support holders 30a–30l of which only 30a and 30h are seen in FIG. 1. Each of the support holders 30a–30l is represented by numeral 30 in FIG. 4 and shown comprising a magnetically permeable (e.g. iron) core member 31 secured to the disk 29 and a coil 32 electromagnetically associated with the core member 31. Thus, in the support assembly 24 each of the coils 32a–32l may normally be held either deenergized or energized to allow each permanent magnet 28a, . . . , 28l to remain attracted to the core member 31a, . . . , 31l and spacedly juxtaposed with the workpiece 6.

Figure 3:
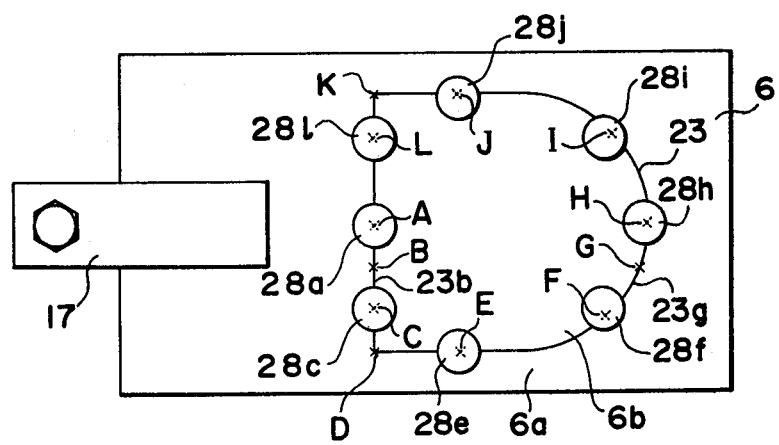
FIG. 3 is a top plan view illustrating a workpiece cut into a first and second portions along a closed-loop cutting path or cut groove and a plurality of permanent magnets deposited successively along the cut groove according to the invention.

The motor 27 and the coils 32a–32l are controlled by a command source 33. A predetermined sequential order in which the permanent magnets 28a–28l are released from the respective retainer members 31a–31l in the support assembly 24 is preprogrammed in the command source 33. In the cutting operation, the command source 33 may provide a sequence of timing signals. Each timing signal may be generated upon lapse of a predetermined time period after the cutting is commenced or a previous timing signal is generated indicating the position in the workpiece 6 where cutting is in progress and hence the position of intersection of the cut groove (behind the advancing axis of wire 5) with the circular array of permanent magnets 28a–28l projected on the surface (upper) of the workpiece 6. The timing signal may provide a positioning signal which acts via a line 34 on the motor 27 to cause the support assembly 24 to rotate by a predetermined angle programmed to locate a predetermined permanent magnet 28 immediately above that position of intersection and then provides a drive signal which acts via a line 35 on the coil 32a, 32c, 32e, 32f, 32h, 32i, 32j, or 32l associated with that magnet. The purpose of the drive signal is to magnetically release the magnet 28 and to propel it downwards by a combination of the magnetic repulsion and gravity onto the region of the aforementioned position of intersection on the surface (upper) of the workpiece 6. With the coil 32 arranged to be normally deenergized to retain the magnet 31, the drive signal may be a "1" signal to repel it from the core member 31. In contrast, with the coil 32 arranged to be normally energized with a "1" signal to retain the magnet 31, the drive signal may be an "0" signal but preferably should be "1" signal in the opposite direction or "−1" signal. The permanent magnet 28 propelled downwards land to magnetically bridge the two portions 6a and 6b of the workpiece which is, of course, magnetically permeable, thereby holding the latter portion 6b against falling off the former portion 6a due to gravity. As the cutting advances, the permanent magnets 28a–28l are successively released in response to the sequential timing signals from the command source 33 to deposit, in this manner, on the cut groove or cutting path 23 behind the wire 5 at preselected locations A, C, E, F, H, I, J and L as shown in FIG. 3. As a consequence, not only is the possibility of an actual drop-off of the second portion 6b eliminated, but also the possible deflection of the workpiece at the cutting zone and the resultant cutting inaccuracy due to the weight of the second portion 6b tending to fall off the first 6a is avoided. In addition, the operation is fully automatic and requires no operator's attention during the course of cutting operation.

It will be noted that the rotation of the support assembly 24 is not essential. A predetermined number of permanent magnets 28 and their associated core member 31 may be arranged in one or more rows, circular or otherwise, about an axis of the support assembly 24, the number and the arrangement being chosen in accordance with the particular cutting path and the locations thereon where their projections on the moving workpiece can traverse the cutting path behind the cutting zone. The command source 33 can then simply provide timing signals in succession which should be applied to coils 32, respectively, as the cutting advances along the cutting path. Each timing signal is generated and applied to the coil 32 at a predetermined time instant at which the corresponding magnet 28 is preprogrammed to pass over the cut groove or cutting path behind the advancing cutting zone.

The command source 33 may be connected via a line as shown by the broken line to the machining feed control unit 22 to sequentially furnish the timing signals to provide the successive positioning signals for the support assembly 24 to locate the permanent magnets 28 sequentially immediately above the respective desired locations on the cutting path behind the cutting zone and/or to provide the drive signals sequentially to release the permanent magnets positioned.

It will also be noted that the support assembly 24 need not necessarily be disposed above the workpiece 6 and instead may be disposed to support the permanent magnets 28 as spacedly from below juxtaposed with the lower surface of the workpiece 6 and to allow each of them to be propelled by magnetic repulsion against gravity.

Various further forms of retention and propelling mechanisms which the support holders 30 on the support assembly 24 may incorporate to retain and selectively release the permanent magnets or attractable members 28 for sequential deposition on the cut groove 23 on the workpiece 6 are possible and will be described in respect of certain embodiments thereof with reference to the remainder of the drawing in which the same reference numerals are used to indicate the same or functionally same components as in FIGS. 1–4.

Figure 5:
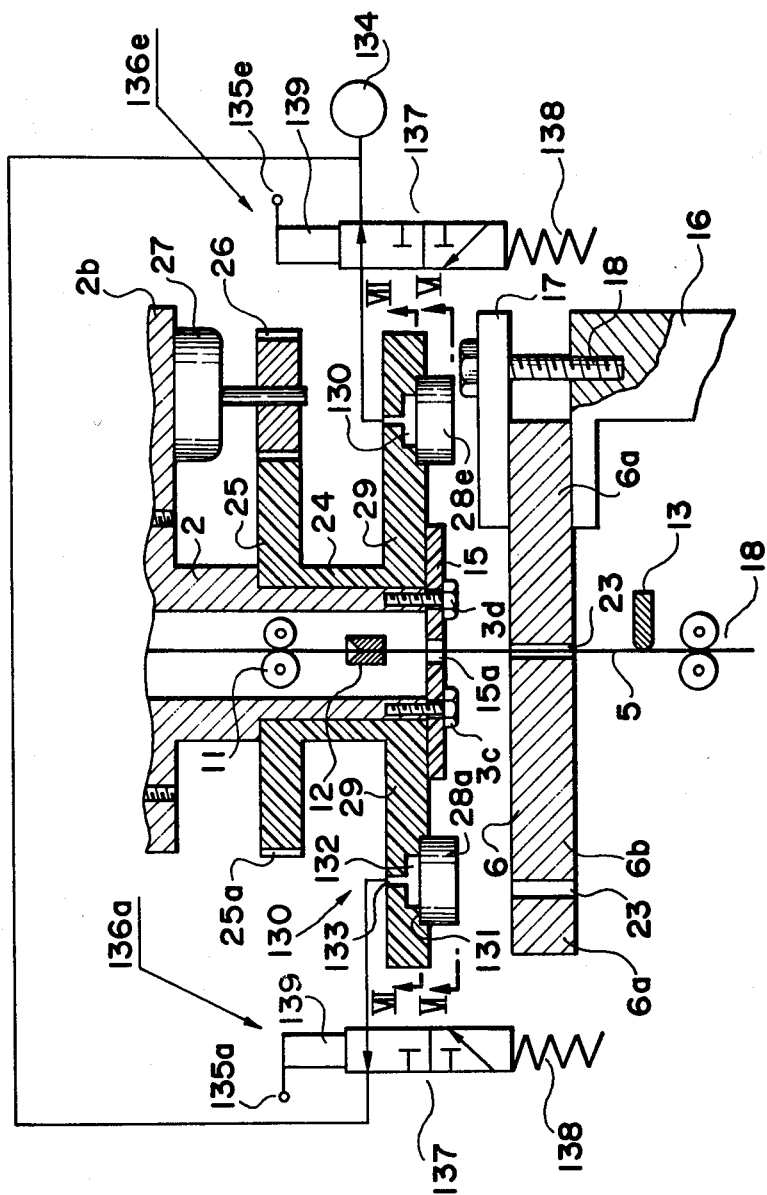
FIG. 5 is a side-elevational view diagrammatically illustrating an essential portion of the machine with another embodiment of the invention using a plurality of vacuum chucks as holder units releasably retaining the permanent magnets.
Figure 6:
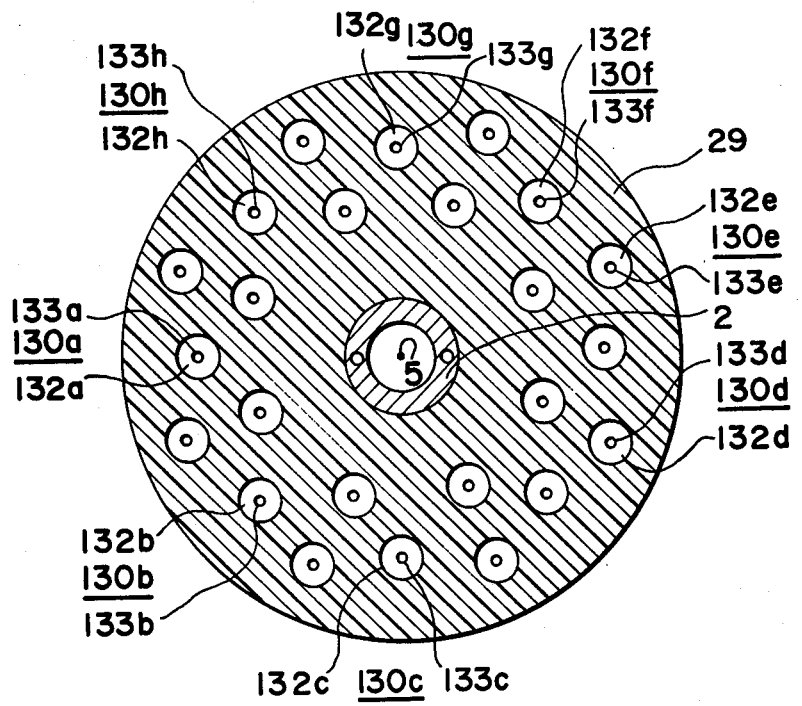
FIGS. 6 and 7 are plan views taken along lines VI—VI and VII—VII, respectively, in FIG. 5.
Figure 7:
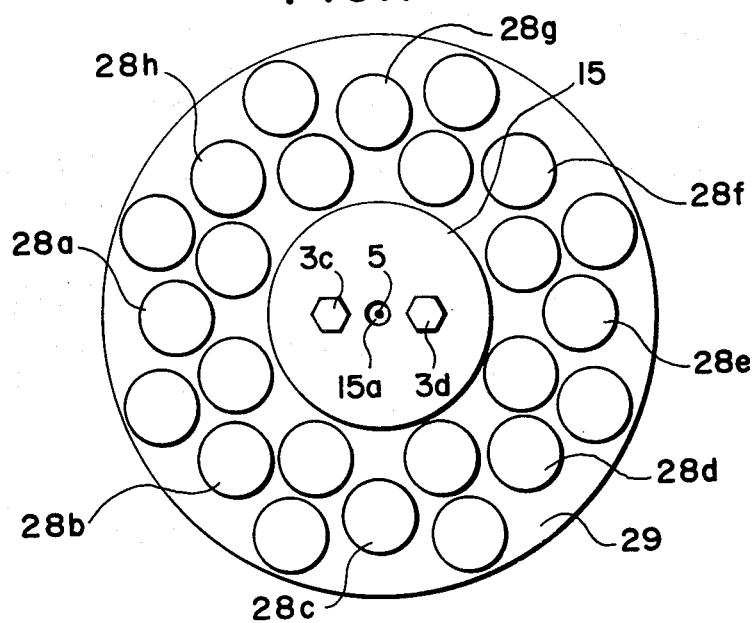

In FIG. 5, the support assembly 24 is shown as incorporating a plurality of vacuum chucks 130 in the plate or the respective arms 29 extending from the base 24a, each of the chucks holding a permanent magnet 28. In FIGS. 6 and 7, the element 29, here again composed of a nonmagnetic material such as plastic, is shown, as in FIG. 2, in the form of a disk holding a plurality of permanent magnets 28a, 28b, ..., 28h, ... with respective chucks 138a, 130b, ..., 130h.... Two of the permanent magnets, 28a and 28e, and the corresponding vacuum chucks, 130a and 130e, are shown in FIG. 5. Each of the chucks 130 comprises a recess 131 in which the permanent magnet 28 is seated, a chamber 132 open to the recess 131 and a port 133 which communicates with a suction pump 134 via a three-port and two-position switching valve 136. Two such valves are shown in FIG. 5 and designated by references 136a and 136e. Each valve 136 comprises a valve body 137 and is provided with a spring 138 which acts on the body 137 to normally position the valve 136 to connect the port 133 with the suction pump 134 so that the chamber 132 is held at a vacuum to retain the permanent magnet 28 in the seat 131. Each valve 136a, ..., 136h, ... is also provided with a solenoid 139 having an input terminal 135a, ..., 135h, ... fed with a drive signal from the command source 33 is shown in FIG. 1. When the drive signal develops at the input terminal 135, the valve 136 is switched to disconnect the port 133 and hence the chamber 132 from the suction pump 134, permitting the magnet 28 to dislodge from the seat 131. The released permanent 28 is allowed to propel downwards by gravity and land on the workpiece 6 to bridge the two portions 6a and 6b across the cut groove 23 as described hereinbefore.

It should be noted that permanent magnets 28a, ... may be replaced by masses of suitable adhesive.

FIGS. 8(A) and 8(B) show a permanent-magnet assembly 128 which may constitute each of the members 28a, .... The assembly 128 comprise a cylindrical permanent magnet 140 which may be composed of a rare-earth magnetic alloy such as SmCo5 which is accommodated in an annular body composed of a nonmagnetic material such as a plastic which is, in turn, received in a cup-shaped body 142 of magnetically permeable material such as iron in contact with the permanent magnet 140. Such a structure of the assembly 128 is particularly suitable for use when the element 29 is composed of a magnetically permeable material in the embodiment of FIGS. 5-7. The lateral and rear portions 142b abd 142c of the body practically will have no ability to be attracted magnetically to the supporting element 29 while the frontal annular surface 142a thereof is capable of forming a magnetic path with the permanent magnet 140 when in contact with the magnetically permeable workpiece 6.

Figure 9:
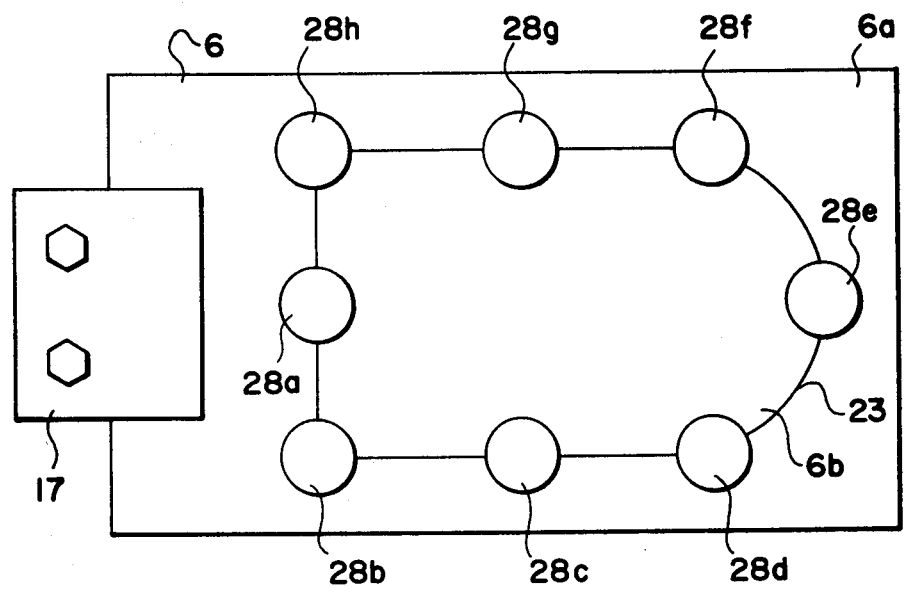
FIG. 9 is a similar view to that shown in FIG. 3, which is shown in connection with FIGS. 5-7.
Figure 11:
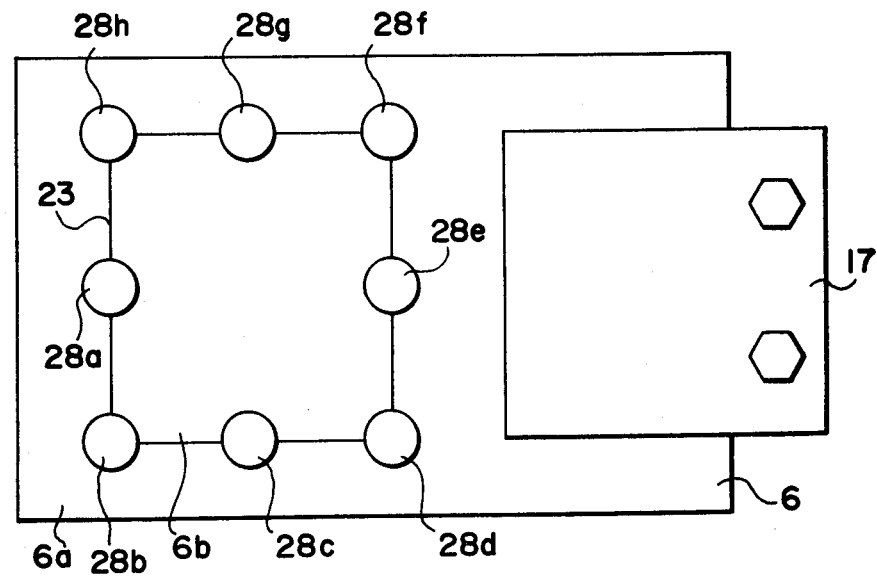
FIG. 11 is a top plan view similar to FIGS. 3 and 9, which is used in connection with FIG. 10.

The permanent magnets 28a, ..., 28h as deposited on the workpiece 6, bridging the two severed portions thereof 6a and 6b across the cut groove 23, are shown in FIGS. 9 and 11.

The embodiment of the invention shown in FIGS. 5-7 can be modified so that each of the permanent magnet 28 is retained by magnetic attraction and released by a fluid pressure. For example, the support disk, plate or arm 29 may be composed of ferromagnetic material to magnetically attract the permanent magnet 28 in the retention stage. The vacuum pump 134 may be replaced by a suitable pneumatic pressure pump to apply a fluid pressure to the permanent magnet to allow it to be detached from the element 29 against the magnetic attraction in the releasing stage.

Figure 10:
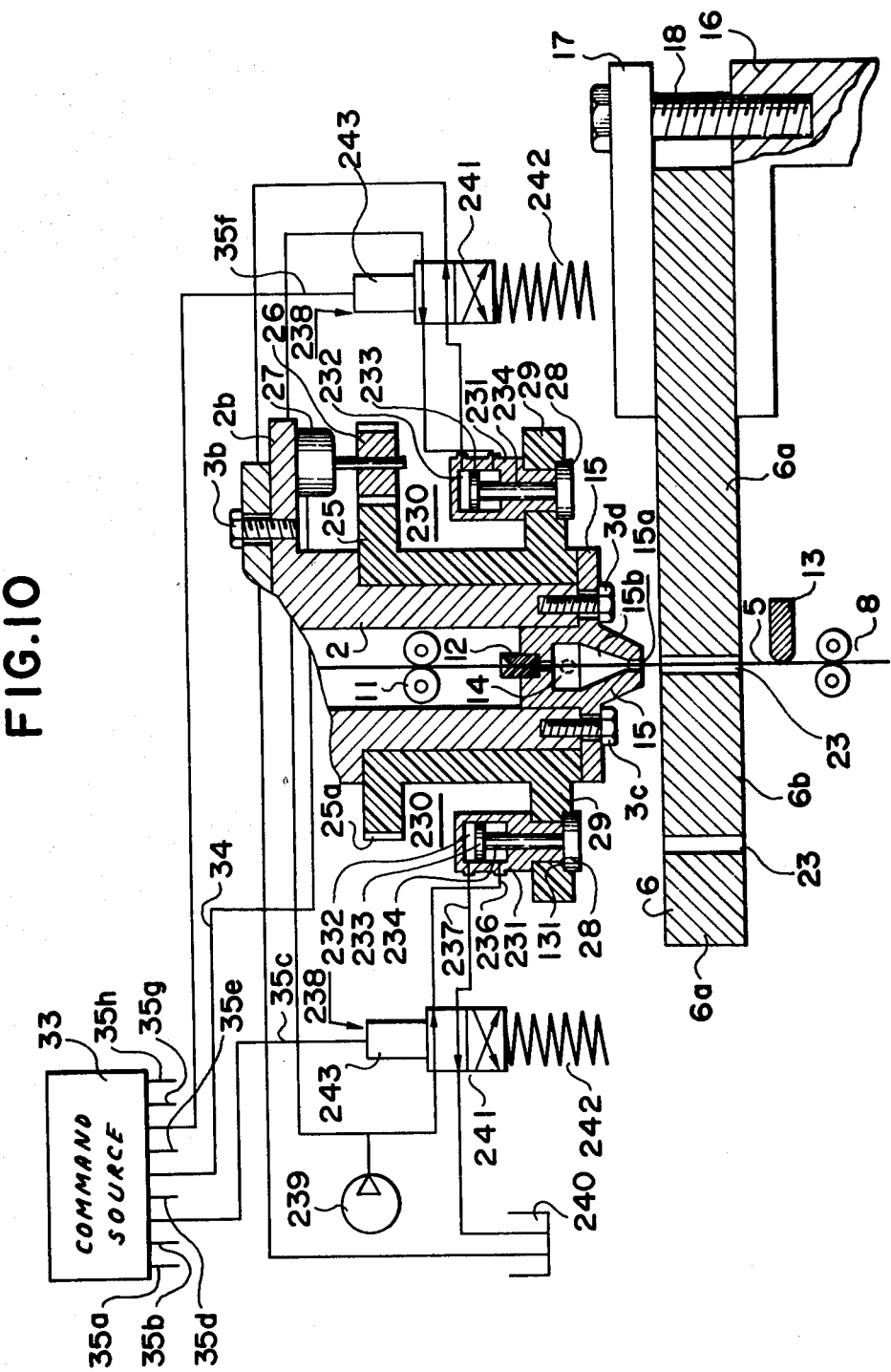
FIG. 10 is a side-elevational view of an essential portion of the machine with an embodiment of the invention using a plurality of hydraulic or pneumatic piston-type thrust units for releasing the respective permanent magnets.

FIG. 10 shows an embodiment of the invention in which each of a plurality of the permanent magnets 28 is retained by magnetic attraction and released by the thrust of a piston in a support holder 230. Two such support holders are shown. Each holder 230 includes a cylinder 231 composed of a magnetically permeable metal, a chamber 232 formed therein and a piston 233 having a piston rod 234 slidably extending through the cylinder 231 downwords. The piston 233 is shown positioned to retract the piston rod 234 to hold the permanent magnet 28 to be attracted to the cylinder 231. The piston rod 234 is composed of a magnetically nonsusceptible material such as a plastic as is the disk, plate or arms 29. It will be apparent that the whole body of the cylinder 231 need not be magnetically permeable and only the lower portion thereof may be magnetically permeable. Further, in FIG. 10, the element 15 is shown forming a chamber 15b at the lower end of the tubular machining head 2, the chamber 15b being fed with the machining liquid through the inlet port 14 to supply it through the opening 15a into the cutting region defined between the traveling wire 5 and the workpiece 6. The upper machining guide 12 is shown as seated in the element 15.

The permanent magnets 28 and their respective support holders 230 on the support assembly 24 are, here again, arranged to surround the traveling wire 5 above or below the workpiece 6. The cylinder chamber 232 in each support holder 230 is formed with two fluid ports 236 and 237 which are connected via a four-port and two-position switching valve 238 with a pump 239 and a reservoir 240. Each valve 238 comprises a valve body 241 and is provided with a spring 242 which pushes the body 241 to connect the ports 236 and 237 with the pump 239 and the reservoir 240, respectively. In this state, the piston 233 is upwardly retracted to permit the permanent magnet 28 to be kept attracted to the cylinder 231 and held in the seat 131. Each valve 238 is also provided with a solenoid 243 having an input terminal ..., 35c ... 35e, ... fed with a drive signal from the command source 33. When the drive signal develops at the input terminal 235, the valve 238 is switched to connect the ports 236 and 237 to the reservoir 240 and the pump 239, respectively. This causes the piston rod 234 to move downwards and apply a downward thrust to the permanent magnet 28. The latter released from the seat 131 is propelled to land on the workpiece 6, bridging the two severed portions 6a and 6b across the cut groove 23b. Furthermore, in this embodiment as well, the command source 33 may provide a rotary positioning signal which is applied via a line 34 to the motor 27 to locate the support holders 130 and the permanent magnets 28 respectively retained thereby sequentially immediately above the respective desired locations on the cutting path as previously described.

In a modification shown in FIG. 12, the cylinder 231 of each support holder 230 is seated into an opening 290 formed through the disk, plate or each of the arms 29 to extend the piston rod 234 therethrough as shown. The opening 290 is open to the recess 131 in which the permanent magnet 28 is seated and magnetically attracted to the element 29 which is magnetically permeable and is thereby retained by the support holder unit 230. When the solenoid 243 is energized by the drive signal from the command source 33, the valve 238 is switched to push the piston rod 234 downwards, thereby releasing the permanent magnet 28.

It will be understood that the permanent magnetic assembly 128 shown in FIGS. 8(A) and 8(B) can be advantageously used with the embodiments of FIGS. 10 and 12 as well.

A further modification of the magnet assembly may, as shown at 228 in FIG. 13, comprise a permanent magnet 225 having a disk 244 of a magnetically permeable material attached thereto. The assembly 225 may be retained in the recess 131 of the element 29 by means of a holding element or elements 245 which may be one or more springs or a rubber. The piston 234 normally retracted upwards is moved down to give a thrust to the assembly 228 to allow it to be released thereby against the retention action by the holding element 245.

FIG. 14 shows another form of the unit 330 constituting each of a plurality of support holders carried on the support assembly 24. The unit 330 comprises a casing 331 attached to the disk, plate or each of the arms 29 by means of bolts 3e and 3f. The casing 331 is composed of a magnetically permeable material and is shown having the permanent magnet 28 magnetically attracted thereto in a recess 331a formed at its lower end. Within the casing 331 there is accommodated a toggle 332 which has a fulcrum 332a secured at its upper end and a movable pin 332b at its center. The pin 332b is normally biased leftwards by a spring 333 and has a movable ferromagnetic member 334 secured thereto. In this state, the lower arm 332c of the toggle is disengaged from the permanent magnet 28. The movable member 334 is electromagnetically associated with a solenoid 335 to be fed with a drive signal from the command source 33 previously described. When the solenoid 335 is energized with the drive signal, the ferromagnetic member 334 is displaced rightwards to move the lower arm 332c of the toggle 332 downwards. The latter thus gives a thrust to the permanent magnet 28 to permit it to be released from the seat 331a.

The toggle-switch system of FIG. 14 may be modified as shown in FIG. 15 by replacing the movable ferromagnetic member 334 with a cam 336 rotated by a motor 337. When the motor 337 is rotated in response to a drive signal furnished from the command source 33, the cam 336 comes in engagement with the movable center 332b of the toggle 332 and causes the latter to stretch against the spring 333. The lower arm 332c of the toggle 332 is moved downwards to release the permanent magnet 28 from the seat 331a.

It will be apparent that the permanent magnet assembly 128 shown in FIGS. 8(A) and 8(B) may be used here, too. Further, resilient holding elements 245 shown in FIG. 13 can advantageously be included in the recess seat 331a.

Figure 17:
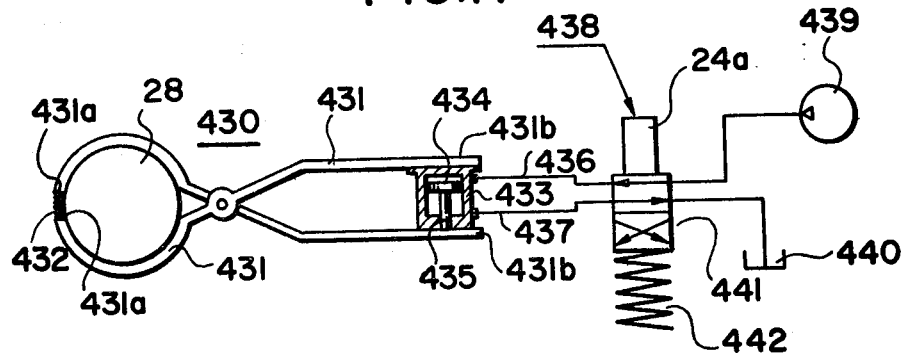
FIG. 17 is a plan view of each support holder in the embodiment of FIG. 16.
Figure 18:
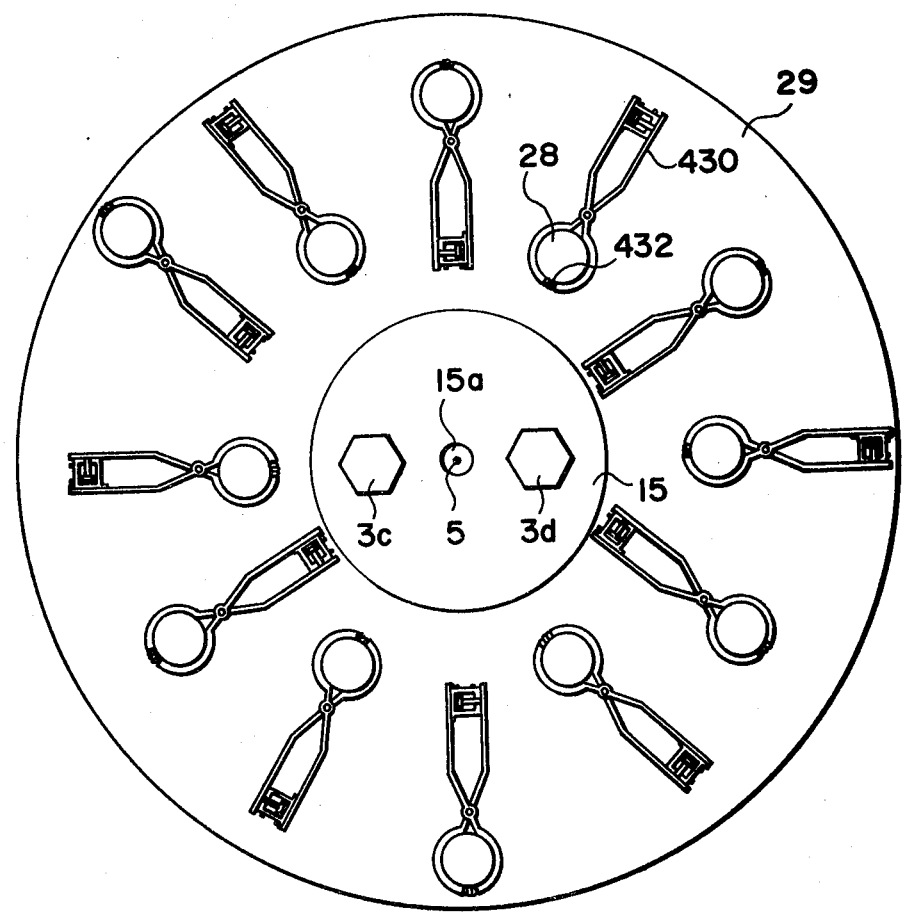
FIG. 18 is a plan view taken along the line XVIII—XVIII in FIG. 16.

FIG. 16 shows a further embodiment of the invention in which a plurality of scissors-type support holders 430 are used to releasably retain a plurality of permanent magnets 28. Each of such holders 430 which are carried by the plate, the disk or the respective arms 29 as shown in FIGS. 16 and 18 may, as shown in FIG. 17, comprise a pair of holding elements 431 having a spring 432 inserted between their opposed end faces 431a to serve as a cushion for holding the permanent magnet 28. A cylinder 433 is inserted between their other opposed end legs 431b and has a piston 434 accommodated therein. The piston 434 has a piston rod 435 extending through one end of the cylinder 433 to come in engagement with one of the legs 431b. The cylinder 433 has a pair of ports 436 and 437 connectable via a four-port two-position valve 438 with a hydraulic or air pump 439 and a reservoir 440. The valve 438 includes a valve body 441 and is provided with a spring 442 to bias the valve body 441 to normally connect the ports 437 and 436 with the pump 439 and the reservoir 440, respectively, to hold the piston 434 to occupy its upper most position as viewed in FIG. 17 within the cylinder 433. This holds the permanent magnet 28 to be firmly retained with the holding elements 431. The valve 438 is also provided with a solenoid 443 furnished with a drive signal from the command source 33. When the solenoid 443 is energized with the drive signal, the valve 438 is switched to connect the ports 436 and 437 with the pump 439 and the reservoir 440, respectively. This causes the piston 434 and the piston rod 435 to move downwards as viewed in FIG. 17 to expand the holding elements 431, thereby releasing the permanent magnet 28.

In the embodiment of the invention shown in FIG. 19, each permanent magnet 28 is releasably retained with an elastic and nonmagnetic metal 531 in each holder assembly 530. In this embodiment, the permanent magnet 28 is formed on its top with a projected annular rim 23r adapted to hang on a shoulder 531a formed in the cylindrical lower portion 531b of the metal 531, which in turn hangs at its top 531c on the shoulder constituted by the periphery of an opening 532 formed through the element 29 and open to the recess 533 loosely accepting the cylinder 531b. The metal 531 is formed intermediate its top 531c and cylindrical portion 531b with an upwardly divergent tapered portion 531d for slidably receiving a truncated-conical body 534 formed at the lower end of a rod 535 having at its top a ferromagnetic body 536. The latter is electromagnetically associated with a solenoid coil 537 energized by a power supply 33b in response to a drive signal generated by a control portion 33a of the command source 33. When the coil 537 is energized by the drive signal, the movable ferromagnetic member 536 is moved downwards to cause the truncated-conical body 534 to extend the metal 531 in contact therewith so that the permanent magnet 28 is released from the supporting shoulder 531a.

FIG. 20 shows a further holder assembly 630 which includes a cup-shaped member 631 composed of a nonmagnetic material attached to a preselected location of the plate, disk or each of the arms 29 previously described. The cup-shaped member 631 which is open towards the workpiece (not shown) defines a recess 632 for loosely accepting the permanent magnet 28. The latter is here again formed at its top with a projected annular rim 28r which is shown hanging on a pair of rods 633 which extend horizontally in a common plane into the recess 633 slidably through a pair of holds 634 from a pair of casings 635, respectively, each under the pressure exerted by a spring 636. Each of the rod 633 is ferromagnetic and here again electromagnetically associated with an energizing coil 637. When a drive signal is furnished to each coil 637 from the command source (not shown), each rod is retracted against the pressure of spring 636 to release the permanent magnet 28 to allow it to drop by gravity towards the workpiece. The cup-shaped member 631 is also shown having a pressure switch 638 which, when pressured, is designed to cut off the energizing current for the coils 637. To allow the permanent magnet 28 to be properly loaded in the recess 632, the coil 637 is energized to cause the holder rods 633 to be retracted. The permanent magnet 28 will be properly loaded within the recess 632 by pushing it against the pressure switch 638. The switch 638 will then actuate to cut off the energizing current for the coils 637 to allow the rods 632 to move forward to hold the permanent magnet 28.

What is claimed is:

1. In the process of cutting a contour in a workpiece securely carried partially on a work support in a cutting machine by axially transporting an elongate tool through the workpiece while relatively displacing the work support and the traveling elongate tool to advance the workpiece transversely to the axis of travel of the elongate tool along a programmed cutting path describing said contour, thereby progressively forming, behind the tool advancing along said path, a cutting slot dividing the workpiece into a first portion held secured by the work support and a second portion tending, due to gravity, to fall off the first portion, a method of preventing the second portion from falling off, comprising the steps of:

(a) spacedly juxtaposing with said workpiece, a plurality of members releasably retained respectively by a like plurality of mutually spaced-apart support holders arranged on a support assembly in said machine, each of said members having a width which is greater than the width of said cutting slot and adapted to span the same and, when brought to the proximity of said workpiece, being capable of being automatically anchored thereon by an intrinsic retention force;

(b) initiating the cutting of said workpiece while maintaining said members respectively retained by said support holders; and (c) during the course of cutting of said contour in said workpiece, successively releasing said members from said respective support holders whereby said members are successively deposited at mutually spaced-apart locations on said cutting slot but substantially outside the slot so that each of the members securely bridges said first and second portions across said slot.

2. The method defined in claim 1, further comprising the step of: in step (a), positioning said support assembly in said machine so as to dispose said members about said axis of travel of the elongate cutting tool in the vicinity of one surface of said workpiece.

3. The method defined in claim 2 wherein said workpiece is carried by said work support so as to be movable in a horizontal plane.

4. The method defined in claim 3 wherein said members are carried by said support assembly so as to locate adjacent to the upper surface of said workpiece.

5. The method defined in claim 3 wherein said members are carried by said support assembly so as to locate adjacent to the lower surface of said workpiece.

6. The method defined in claim 3 wherein in step (c), said support assembly is held securely in position while said work support is displaced horizontally to advance the workpiece during the cutting of said contour, further comprising the step of: in step (a), positioning said members on said support assembly in a predetermined arrangement so programmed as to allow said members to be successively deposited on said locations with the progress of cutting along said path.

7. The method defined in claim 3 wherein said support assembly is adapted to rotate about an axis vertical to said horizontal plane, further comprising the steps of: in steps (a), a positioning said members on said support assembly in one or more rows about said axis of rotation and in step (c), prior to releasing each member from the support holder therefor, rotating said assembly by an angle programmed to locate said member immediately adjacent to the location on said cutting path preprogrammed for said member to deposit thereon.

8. The method defined in claim 7 wherein said axis of rotation substantially coincides with said axis of travel.

9. The method defined in claim 1 wherein each of said members is a permanent-magnet member.

10. The method defined in claim 9 wherein in steps (a) and (b), each of said magnet members is retained by the support holder therefor at least in part by magnetically attracting said magnet member to a ferromagnetic element constituting at least a portion of said support holder.

11. The method defined in claim 10 wherein in step (c), each of said magnet members is released at least in part by applying a magnetic repulsion to said member against said ferromagnetic element.

12. The method defined in claim 10 wherein in step (c), said magnet member is released at least in part by applying to said member a mechanical thrust sufficient for said member to detach from said ferromagnetic element against the magnetic attraction.

13. The method defined in claim 12 wherein said mechanical thrust is applied to said member by means of a piston.

14. The method defined in claim 12 wherein said mechanical thrust is applied to said member by means of a toggle.

15. The method defined in claim 10 wherein in step (c), said magnet member is released at least in part by applying to said magnet member a fluid pressure sufficient for said member to detach from said ferromagnetic element against the magnetic attraction.

16. The method defined in claim 9 wherein in steps (a) and (b), each of said magnet members is retained by said support holder therefor at least in part by applying to said member a vacuum pressure sufficient for the member to be attracted to at least a portion of said support holder.

17. The method defined in claim 16 wherein in step (c), said magnet member is released at least in part by removing said vacuum pressure.

18. The method defined in claim 9 wherein in steps (a) and (b), each of said magnet members is retained by said support holder therefor at least in part by elastically holding said magnet member with clamping means constituting at least a portion of said holder and adapted to retain it at least in part against gravity.

19. The method defined in claim 9 wherein in steps (a) and (b), each of said magnet members is retained by said support holders therefor at least in part by clamping said magnet member with a plurality of levers constituting at least a portion of said holder and adapted to retain it at least in part against gravity.

20. The method defined in claim 18 or claim 19 wherein in step (c), said magnet member is released by removing the clamping action by said means on said magnet member.

21. The method defined in claim 1, further comprising the step of successively issuing timing signals to release said members from the respective support holders and to allow them to be propelled sequentially to deposit on said respective spaced-apart locations on said cutting path.

22. The method defined in claim 21 wherein each of said timing signals is issued at a predetermined time instant programmed in conjunction with a trajectory of the projection on said workpiece of the corresponding permanent magnet carried by said support assembly intersecting with said cutting path lying behind said advance of the elongate cutting tool.

23. The method defined in claim 21 wherein each of said timing signals is issued as a function of the position of the axis of travel of the cutting tool advancing along said cutting path.

24. The method defined in claim 22 wherein said cutting path is substantially close-looped.

25. The method defined in claim 4 wherein in step (c), each of said members is propelled at least in part by gravity.

26. The method defined in claim 4 or claim 5 wherein in step (c), each of said members released from the support holder therefor is propelled at least in part by a mechanical thrust exerted thereon by a solid element constituting at least a portion of said support holder.

27. The method defined in claim 4 or claim 5 wherein in step (c), each of said members released from the support holder therefor is propelled at least in part by a fluid pressure.

28. The method defined in claim 1 wherein said cutting tool is in the form of a wire, ribbon or tape composed of an electrically conductive material for electroerosively cutting said contour in said workpiece.

29. The method defined in claim 1 wherein said cutting tool is in the form of a wire, ribbon or tape cladded with abrasive particles.

30. The method defined in claim 1 wherein each of said members is a mass of adhesive.

31. In a machine for cutting a contour in a workpiece, having a work support for securely carrying the workpiece partially on its support surface, means for axially transporting an elongate cutting tool through the workpiece and machining feed means for relatively displacing the work support and the traveling elongate cutting tool to advance the workpiece transversely to the axis of travel of the elongate cutting tool along a programmed cutting path defining said contour, thereby progressively forming, behind the tool advancing along said path, a cutting slot dividing the workpiece into a first portion held secured with the work support and a second portion tending, due to gravity, to fall off the first portion, an apparatus for preventing the second portion from falling off, comprising:
- a plurality of mutually spaced-apart support holders carried on a support assembly in said machine for releasably holding a like plurality of members, respectively, each of said members having a width which is greater than the width of said cutting slot and adapted to span the same and, when brought into the proximity of said workpiece, being capable of being automatically anchored thereon by an intrinsic retention force;
- retention means associated with said support holders in said machine for retaining said respective members held therewith and spacedly juxtaposed with said workpiece; and
- drive means associated with said retention means in said machine and adapted to release the respective retention actions thereof on said members and, while said machine is engaged in cutting said contour in the workpiece, operable automatically in response to successive time-spaced timing signals for successively releasing said respective members from the individual support holders to deposit said members successively at mutually spaced-apart locations on said cutting slot but substantially outside said slot so that each of the members firmly bridges said first and second portions across said slot.

32. The apparatus defined in claim 31, further comprising means for positioning said support assembly in said machine so as to dispose said members about said axis of travel of the elongate cutting tool in the vicinity of one surface of said workpiece.

33. The apparatus defined in claim 32 wherein said positioning means comprises at least a portion of a machining head of said machine.

34. The apparatus defined in claim 32 wherein said workpiece is carried by said work support so as to be movable by said machining feed means in a horizontal plane.

35. The apparatus defined in claim 34 wherein said positioning means is arranged so as to locate said support holders on said support assembly adjacent to the upper surface of said workpiece.

36. The apparatus defined in claim 34 wherein said positioning means is arranged so as to locate said support holders on said support assembly adjacent to the lower surface of said workpiece.

37. The arrangement defined in claim 34 wherein said support assembly is securely positioned with said positioning means while said workpiece support is displaced horizontally by said machining feed means to advance said workpiece and said support holders are positioned on said support assembly in a predetermined arrangement so programmed as to allow said members to be successively released by said drive means to deposit sequentially on said respective locations on the cutting path.

38. The arrangement defined in claim 34 wherein said support assembly is rotatable, relative to said positioning means about a rotary axis which is vertical to said horizontal plane, and said support holders are positioned on said support assembly in one or more rows about said rotary axis, further comprising means operable prior to releasing of each of said members from the support holder therefor for rotating said assembly by an angle so programmed as to locate said member immediately adjacent to the location on said cutting path preprogrammed for said member to deposit thereon.

39. The arrangement defined in claim 38 wherein said positioning means is so arranged as to position said rotary axis of said support assembly substantially to be coincident with said axis of travel of the elongate cutting tool.

40. The apparatus defined in claim 31 wherein each of said members is a permanent magnet member.

41. The apparatus defined in claim 40 wherein said retention means includes a ferromagnetic element constituting at least a portion of each of said support holders for magnetically attracting the corresponding permanent magnet member.

42. The apparatus defined in claim 41 wherein said drive means includes coil means electromagnetically associated with said ferromagnetic element and operable in response to a said timing signal for producing a magnetic repulsion through said ferromagnetic element to repel thereagainst said magnet member, thereby releasing the latter.

43. The apparatus defined in claim 41 wherein said drive means includes mechanical means associated with said retention means for each of said support holders retaining the corresponding magnet member and operable in response to a said timing signal for applying a mechanical thrust to said magnet member to release it from said ferromagnetic element against the magnetic attraction.

44. The apparatus defined in claim 43 wherein said mechanical means comprises a piston.

45. The apparatus defined in claim 43 wherein said mechanical means comprises a toggle.

46. The apparatus defined in claim 41 wherein drive means includes fluid pressure means and operable in response to a timing signal for applying a fluid pressure to a said permanent magnet member to detach it from said ferromagnetic element.

47. The apparatus defined in claim 40 wherein said retention means for each of said support holders includes means for applying a vacuum pressure to the corresponding magnet member to retain it with said support holder.

48. The apparatus defined in claim 47 wherein said driver means includes means for removing said vacuum pressure.

49. The apparatus defined in claim 40 wherein said retention means include mechanical clamping means for holding each of said permanent magnets at least in part against gravity.

50. The apparatus defined in claim 49 wherein said clamping means includes an elastic element for elastically holding said magnet member.

51. The apparatus defined in claim 49 or claim 50 wherein said drive means includes means for removing the clamping action of said clamping means on said magnet member.

* * * * *